US012429812B2

(12) United States Patent
Fujiwara

(10) Patent No.: US 12,429,812 B2
(45) Date of Patent: Sep. 30, 2025

(54) PRESSING MECHANISM, A PROCESS CARTRIDGE, AND AN IMAGE FORMING APPARATUS

(71) Applicant: Hiroshi Fujiwara, Kanagawa (JP)

(72) Inventor: Hiroshi Fujiwara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/761,367

(22) Filed: Jul. 2, 2024

(65) Prior Publication Data

US 2025/0021045 A1 Jan. 16, 2025

(30) Foreign Application Priority Data

Jul. 12, 2023 (JP) ................................ 2023-114299

(51) Int. Cl.
*G03G 21/18* (2006.01)

(52) U.S. Cl.
CPC ................................ *G03G 21/1821* (2013.01)

(58) Field of Classification Search
CPC .................................................. G03G 21/1821
See application file for complete search history.

(56) References Cited

U.S. PATENT DOCUMENTS

| | | | | |
|---|---|---|---|---|
| 9,092,005 B2 * | 7/2015 | Yamamoto | G03G 21/1647 |
| 2015/0227110 A1 * | 8/2015 | Yoshimura | G03G 21/1821 399/111 |
| 2022/0091556 A1 | 3/2022 | Shimizu et al. | |
| 2022/0334532 A1 | 10/2022 | Fujiwara | |
| 2023/0418207 A1 * | 12/2023 | Kainuma | G03G 21/0076 |

FOREIGN PATENT DOCUMENTS

| | | |
|---|---|---|
| JP | H09-190058 A | 7/1997 |
| JP | H11-161134 A | 6/1999 |
| JP | 2001-060042 A | 3/2001 |
| JP | 2009-181021 A | 8/2009 |
| JP | 2010-271598 A | 12/2010 |
| JP | 2012-113184 A | 6/2012 |
| JP | 2014-119590 A | 6/2014 |

* cited by examiner

*Primary Examiner* — Sandra Brase
(74) *Attorney, Agent, or Firm* — XSENSUS LLP

(57) ABSTRACT

A pressing mechanism includes a compression spring, a supporter, and a holder. The compression spring has one end facing a pressing body to bias the pressing body against a target object in a biasing direction. The supporter supports another end of the compression spring. The holder holds the supporter and includes multiple holding portions having different heights to hold the supporter at different positions in the biasing direction. The multiple holding portions are disposed at different positions in a circumferential direction of the supporter.

15 Claims, 6 Drawing Sheets

PRESSING MECHANISM, A PROCESS CARTRIDGE, AND AN IMAGE FORMING APPARATUS

CROSS-REFERENCE TO RELATED APPLICATION

This patent application is based on and claims priority pursuant to 35 U.S.C. § 119 (a) to Japanese Patent Application No. 2023-114299, filed on Jul. 12, 2023, in the Japan Patent Office, the entire disclosure of which is hereby incorporated by reference herein.

BACKGROUND

Technical Field

Embodiments of the present disclosure relate to a pressing mechanism that presses a pressing body such as a developing device against a target object such as a photoconductor drum, a process cartridge including the pressing mechanism, and an image forming apparatus including the pressing mechanism.

Related Art

Image forming apparatuses such as copiers, printers, or facsimile machines are known in which a pressing mechanism (a biasing mechanism) that presses a developing device (a pressing body) against a photoconductor drum (a target object) is installed.

On the other hand, a technology for controlling a cam mechanism that biases a developing roller against the photoconductor drum based on the data stored in a storage device is proposed, for the purpose of optimizing the operation state of the photoconductor drum and the developing roller regardless of the usage time of the process cartridge.

SUMMARY

In an embodiment of the present disclosure, a pressing mechanism includes a compression spring, a supporter, and a holder. The compression spring has one end facing a pressing body to bias the pressing body against a target object in a biasing direction. The supporter supports another end of the compression spring. The holder holds the supporter and includes multiple holding portions having different heights to hold the supporter at different positions in the biasing direction. The multiple holding portions are disposed at different positions in a circumferential direction of the supporter.

In another embodiment of the present disclosure, a process cartridge detachably attached to a body of an image forming apparatus includes the pressing mechanism, a photoconductor drum including the target object, and a developing device including the pressing body.

In still another embodiment of the present disclosure, an image forming apparatus includes the pressing mechanism.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
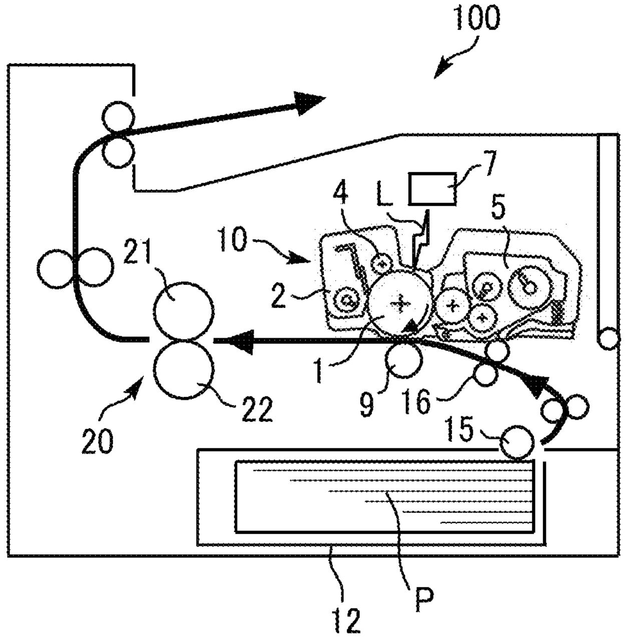
FIG. 1 is a diagram illustrating an overall configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. Like reference signs are assigned to like elements or components and descriptions of those elements or components may be simplified or omitted. As used herein, the singular forms "a," "an," and "the" are intended to include the plural forms as well, unless the context clearly indicates otherwise.

With reference to FIG. 1, a description is given of an overall configuration and operation of an image forming apparatus 100 according to an embodiment of the present disclosure. In FIG. 1, the image forming apparatus 100 that is a printer in the present embodiment includes a photoconductor drum 1 (an image bearer) as a target object on whose surface a toner image is formed, and an exposure device 7 (writing device) that irradiates the photoconductor drum 1 with exposure light L according to image data input from an input device such as a personal computer. The image forming apparatus 100 further includes a transfer roller 9 to transfer the toner image borne on the surface of the photoconductor drum 1 onto a sheet P conveyed to a transfer nip (transfer position), a process cartridge 10 in which the photoconductor drum 1, a charging roller 4, a developing device 5 (a pressing body), and a cleaning device 2 are united, and a sheet feeder 12 (sheet tray) to stack the sheets P such as paper sheets. The image forming apparatus 100 further includes a registration roller pair 16 (a timing roller pair) to feed the sheet P toward the transfer nip where the photoconductor drum 1 contacts the transfer roller 9, and a fixing device 20 to fix an unfixed image on the sheet P. The fixing device 20 includes a fixing roller 21 and a pressure roller 22.

The above-described image forming apparatus 100 includes the charging roller 4, the developing device 5, and the cleaning device 2, around the photoconductor drum 1. These members (the photoconductor drum 1, the charging roller 4, the developing device 5, and the cleaning device 2) are integrated as a process cartridge 10 and are detachably (replaceably) attached to the body of the image forming apparatus 100. The process cartridge 10 is replaced with a new process cartridge in a certain replacement cycle. Specifically, the developing device 5 stores toner (fresh toner) as a developer. When the toner stored in the developing device 5 is depleted due to consumption of the toner in the developing device 5 during the printing operation, the process cartridge 10 is replaced with a new toner container.

Figure 2:
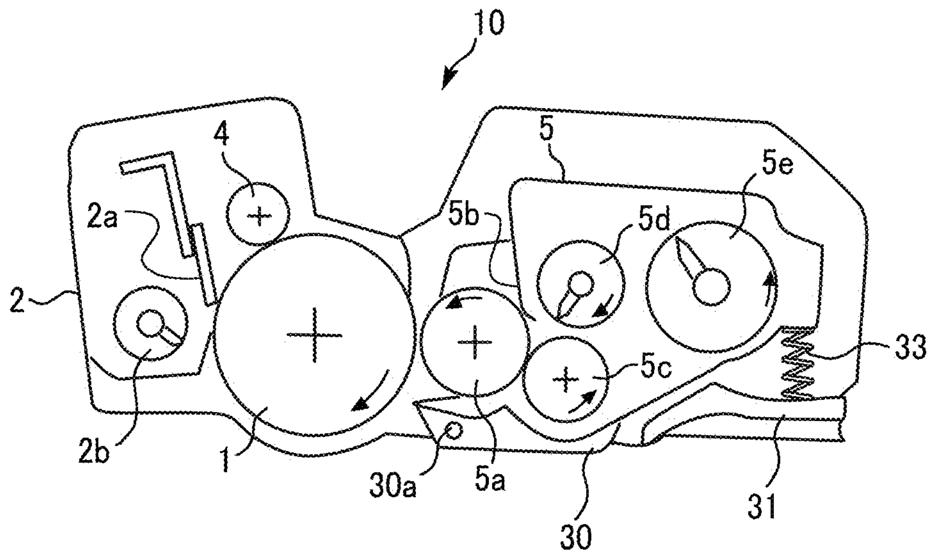
FIG. 2 is a schematic view of a process cartridge.

A description is given of a basic image forming operation performed by the image forming apparatus 100 with reference to FIGS. 1 and 2. With reference to FIG. 1, as image data is transmitted from the input device, such as a personal computer, to the exposure device 7 in the image forming apparatus 100, the exposure device 7 irradiates the surface of the photoconductor drum 1 with exposure light (laser beam) L according to the image data. Meanwhile, the photoconductor drum 1 rotates in a direction indicated by an arrow (clockwise) in FIG. 1. First, the charging roller 4 uniformly charges the surface of the photoconductor drum 1 at a position at which the surface of the photoconductor drum 1 faces the charging roller 4 (in a charging process). As a result, a charging potential is formed on the surface of the photoconductor drum 1. In the present embodiment, the charging potential on the photoconductor drum 1 is approximately −900 V. The charged surface of the photoconductor drum 1 thereafter reaches an irradiation position of the exposure light L. An irradiated portion of the photoconductor drum 1 irradiated with the exposure light L has a latent image potential (from about 0 V to −100 V), and thus an electrostatic latent image is formed on the surface of the photoconductor drum 1 (in an exposure process).

The surface of the photoconductor drum 1 bearing the electrostatic latent image thereon rotates until the surface of the photoconductor drum 1 reaches a position opposite the developing device 5. The developing device 5 supplies toner onto the photoconductor drum 1, thereby developing the latent image formed on the photoconductor drum 1 into the toner image (in a developing process).

As illustrated in FIG. 2, the developing device 5 is a device of a contact one-component development method, and includes, for example, a developing roller 5*a*, a doctor blade 5*b*, a supply roller 5*c*, a first toner conveying screw 5*d*, and a second toner conveying screw 5*e*. The developing device 5 stores toner, that is, a one-component developer. The toner in the developing device 5 is stirred and conveyed by the first toner conveying screw 5*d* and the second toner conveying screw 5*e*. The toner in the developing device 5 is scooped up by the supply roller 5*c* and supplied to the developing roller 5*a* while being triboelectrically charged by the sliding contact between the supply roller 5*c* and the developing roller 5*a*. The toner supplied to the developing roller 5*a* is regulated by the doctor blade 5*b* and reaches a contact position (developing region) with the photoconductor drum 1. At this time, the toner on the developing roller 5*a* is triboelectrically charged by the sliding contact with the doctor blade 5*b*. The toner adheres to the electrostatic latent image on the photoconductor drum 1 at the development region. Thus, the toner image is formed on the photoconductor drum 1. The developing roller 5*a* and the two conveying screws 5*d* and 5*e* are driven to rotate by a drive motor disposed in the body of the image forming apparatus 100 in the respective directions indicated by arrows in FIG. 2.

After the developing process, the surface of the photoconductor drum 1 bearing the toner image thereon reaches the transfer nip (transfer position) between the photoconductor drum 1 and the transfer roller 9. In the transfer nip between the photoconductor drum 1 and the transfer roller 9, a transfer bias having a polarity opposite the polarity of the toner is applied from a power source to the transfer roller 9, thereby transferring the toner image formed on the photoconductor drum 1 onto the sheet P conveyed by a registration roller pair 16 (in a transfer process).

The surface of the photoconductor drum 1 after the transfer process reaches a position opposite the cleaning device 2. At this position, untransferred toner remaining on the surface of the photoconductor drum 1 is mechanically removed by a cleaning blade 2*a* and collected in the cleaning device 2 (in a cleaning process). Thus, a series of image forming processes on the photoconductor drum 1 is completed. The untransferred toner collected in the cleaning device 2 is leveled by a collecting screw 2*b* disposed in the cleaning device 2.

The sheet P is conveyed to the transfer nip (transfer position) between the photoconductor drum 1 and the transfer roller 9 as follows. First, a feed roller 15 feeds the uppermost sheet P of the stack of sheets P stored in the sheet feeder 12 toward a conveyance passage. Thereafter, the sheet P reaches the registration roller pair 16. The sheet P that has reached the registration roller pair 16 is conveyed to the transfer nip (the contact position of the transfer roller 9 with the photoconductor drum 1) in synchronization with an entry of the toner image formed on the photoconductor drum 1 into the transfer nip.

After the transfer process, the sheet P passes through the transfer nip (the position of the transfer roller 9) and reaches the fixing device 20 through the conveyance passage. In the fixing device 20, the sheet P is interposed between the fixing roller 21 and the pressure roller 22. The toner image is fixed on the sheet P by the heat applied from the fixing roller 21 and the pressure applied from both the fixing roller 21 and the pressure roller 22. After the sheets P having the fixed toner image thereon are ejected from the fixing nip formed between the fixing roller 21 and the pressure roller 22, the sheets P are ejected from the body of the image forming apparatus 100 and stacked on an output tray. Thus, a series of the image forming processes is completed.

Figure 3:
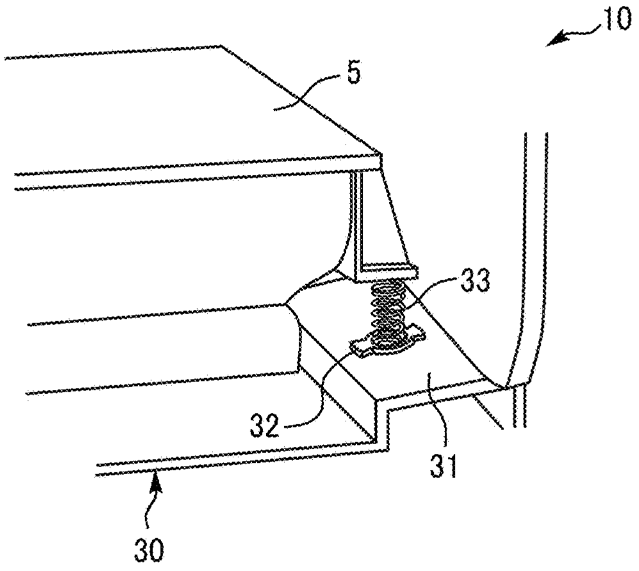
FIG. 3 is a perspective view of the process cartridge, illustrating a pressing mechanism and elements around the pressing mechanism.

A description is given of a pressing mechanism in the process cartridge 10 (the image forming apparatus 100) in the present embodiment in detail below. With reference to FIGS. 2 and 3, the pressing mechanism in the present embodiment is for pressing (biasing) the developing device 5 (developing roller 5*a*) as a pressing body against the photoconductor drum 1 as a target object. The pressing mechanism includes, for example, a compression spring 33, a supporter 32, and a holder 31.

One end of the compression spring 33 directly contacts the developing device 5 (pressing body) (or indirectly contacts via another member) and biases the developing device 5 in a specified biasing direction (pressing direction) toward the photoconductor drum 1 (target object). Specifically, the developing device 5 is held by a case 30 (housing) of the process cartridge 10 to be swingable (rotatable) around a support shaft 30*a* disposed in the case 30 (housing).

Figure 4:
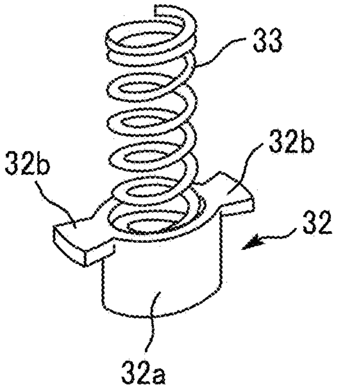
FIG. 4 is a perspective view of the pressing mechanism in which a compression spring is attached to a supporter.
Figure 5A:
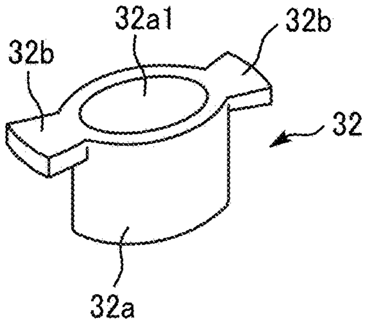
FIG. 5A is a perspective view of the supporter as viewed obliquely from above.
Figure 5B:
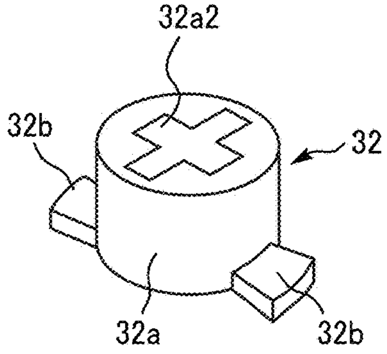
FIG. 5B is a perspective view of the supporter as viewed obliquely from below.

As illustrated in FIGS. 3 and 4, the supporter 32 supports another end of the compression spring 33. Specifically, the supporter 32 has a columnar portion 32*a* and a plurality of projections 32*b* (base portions). The columnar portion 32*a* has a concave portion 32*al* into which the other end of the compression spring 33 is inserted, and an operation portion 32*a*2 (cross-shaped hole) into which a tool such as a Phillips screwdriver is inserted to rotate the supporter 32 when the supporter 32 is assembled to the holder 31. The operation portion 32*a*2 is formed on a surface of the columnar portion 32*a* opposite to the concave portion 32*al* (the bottom surface in the assembled state). The plurality of projections 32*b* (at least two projections 32*b*) protrude in a substantially fan shape in the radial direction from the periphery of the columnar portion 32*a* and are arranged at equal intervals in the circumferential direction of the columnar portion 32*a*. Specifically, in the present embodiment, the two projections 32*b* are arranged at equal intervals with a phase shift of 180° in the circumferential direction to protrude horizontally from the outer circumferential surface of the columnar portion 32*a*.

Figure 6:
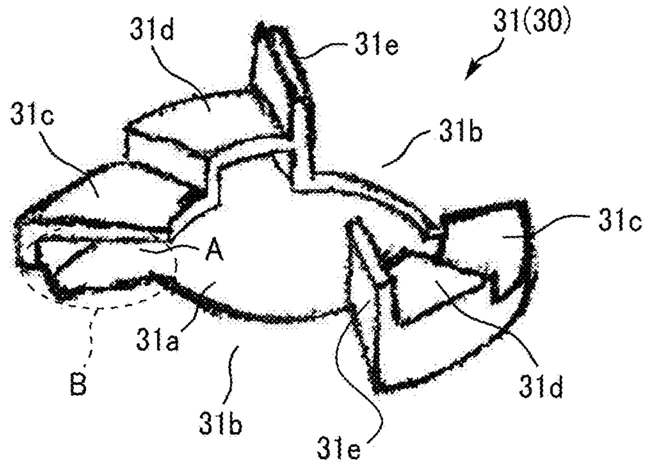
FIG. 6 is a perspective view of a case illustrating a part which functions as a holder.

As illustrated in FIG. 3, the holder 31 holds the supporter 32 and functions as a part of the case 30 of the process cartridge 10. The case 30 holds the photoconductor drum 1 (target object), holds the developing device 5 (pressing body) to be swingable around the support shaft 30*a*, and has the holders 31 at both ends of the case 30 in the longitudinal direction united with the case 30. The holder 31 has a hole 31*a* and a plurality pairs of holding portions 31*b* to 31*d*, which are to be described later in detail with reference to FIGS. 6 and 7.

With such a pressing mechanism as described above, the developing device 5 is biased toward the photoconductor drum 1 in the process cartridge 10 (is rotated in the counterclockwise direction in FIG. 2 around the support shaft 30*a*), and the developing roller 5*a* contacts the photoconductor drum 1 with a specified contact pressure. In the present embodiment, the pressing mechanism is disposed independently at both ends of the process cartridge 10 in the longitudinal direction (i.e., the direction perpendicular to the plane on which FIG. 2 is illustrated). As a result, the developing roller 5*a* (developing device 5) is pressed against the photoconductor drum 1 in a well-balanced manner over the longitudinal direction of the process cartridge 10.

In the pressing mechanism in the present embodiment, a plurality of holding portions (three pairs of holding portions 31*b* to 31*d* in the present embodiment) for holding the supporter 32 at positions in different biasing directions are disposed in the holder 31 (case 30) at different positions around the supporter 32. Specifically, with reference to FIGS. 6, 7, 8A, and 8B, the holder 31 (case 30) has the hole 31*a* and a plurality of holding portions 31*b* to 31*d*. The hole 31*a* is a portion into which the columnar portion 32*a* of the supporter 32 is inserted (fitted) and passes through the case 30 in the biasing direction (vertical direction). The three pairs of holding portions 31*b* to 31*d* are arranged in a stepped manner such that the positions in the biasing direction are different from each other, are arranged around the hole 31*a* to be shifted in phase in the circumferential direction, and hold a plurality of projections 32*b* (at least two projections).

More specifically, a first holding portion 31*b* of the three holding portions 31*b* to 31*d* is formed on the most upstream side (at the lowest position) in the biasing direction. The first holding portions 31*b* are formed to extend in a substantially fan shape in the radial direction of the holder 31 from the periphery of the hole 31*a* and are arranged at equal intervals in the circumferential direction of the holder 31. Specifically, in the present embodiment, a pair of first holding portions 31*b* are arranged at equal intervals with a phase shift of 180° in the circumferential direction of the holder 31. The first holding portion 31*b* is formed in the same plane as the plane in which the hole 31*a* is opened.

A second holding portion 31*c* is disposed adjacent to the first holding portion 31*b* in the circumferential direction of the holder 31. The second holding portion 31*c* is positioned (at higher position) downstream from the first holding portion 31*b* in the biasing direction. The second holding portions 31*c* are also formed to extend in a substantially fan shape in the radial direction from the periphery of the hole 31*a* and are arranged at equal intervals in the circumferential direction of the holder 31. Specifically, in the present embodiment, a pair of second holding portions 31*c* are arranged at equal intervals with a phase shift of 180° in the circumferential direction of the holder 31.

A third holding portion 31*d* is disposed adjacent to the second holding portion 31*c* in the circumferential direction (in the "opposite direction" to be described later, which is the clockwise direction in FIG. 7) of the holder 31. The third holding portion 31*d* is positioned (at higher position) downstream from the second holding portion 31*c* in the biasing direction. The third holding portions 31*d* are also formed to extend in a substantially fan shape in the radial direction from the periphery of the hole 31*a* and are arranged at equal intervals in the circumferential direction of the holder 31. Specifically, in the present embodiment, a pair of third holding portions 31*d* are arranged at equal intervals with a phase shift of 180° in the circumferential direction of the holder 31.

Figure 7:
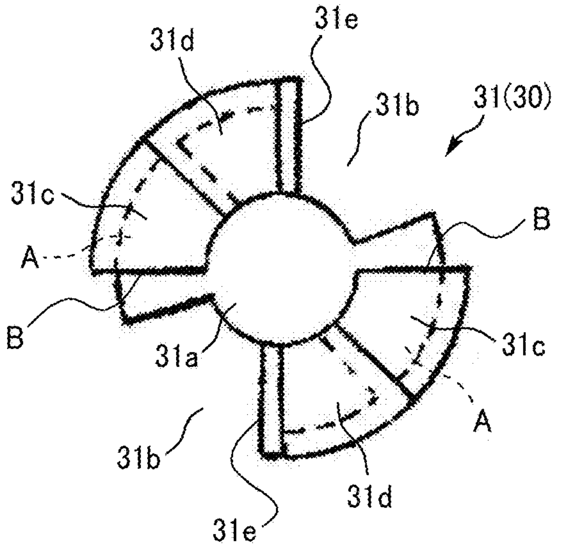
FIG. 7 is a top view of the holder.

As described above, the first holding portion 31*b* to the third holding portion 31*d* are sequentially arranged in the clockwise direction in FIG. 7 and are formed such that the height in the biasing direction of the one arranged downstream in the clockwise direction is higher with reference to the height of the first holding portion 31*b*. Accordingly, when the projection 32*b* is placed on the first holding portion 31*b* among the first holding portion 31*b* to the third holding portion 31*d* and the supporter 32 is held by the holder 31 (the case 30), the use length of the compression spring 33 is the longest and the pressing force of the developing device 5 (the developing roller 5*a*) against the photoconductor drum 1 is the smallest, provided that the other conditions are the same. In contrast, when the supporter 32 is held by the holder 31 (the case 30) in a state where the projection 32*b* is placed on the second holding portion 31*c*, the use length of the compression spring 33 is short, and the pressing force of the developing device 5 (the developing roller 5*a*) against the photoconductor drum 1 is large. When the supporter 32 is held by the holder 31 (the case 30) in a state where the projection 32*b* is placed on the third holding portion 31*d*, the use length of the compression spring 33 is even shorter, and the pressing force of the developing device 5 (the developing roller 5*a*) against the photoconductor drum 1 is even larger.

As described above, in the pressing mechanism in the present embodiment, the holding portion in which the projection 32*b* is held (placed) among the first holding portion 31*b* to the third holding portions 31*d* is changed, so that the pressing force of the developing device 5 (developing roller 5*a*) against the photoconductor drum 1 can be adjusted. In particular, in the present embodiment, a plurality of pressing mechanisms are disposed at intervals in the longitudinal direction of the developing device 5 (pressing body). In the present embodiment, the pressing mechanisms are disposed at both ends of the developing device 5 in the longitudinal direction. With such a configuration, the pressure of the developing device 5 (developing roller 5*a*) against the photoconductor drum 1 can be adjusted independently depending on the positions in the longitudinal direction. For example, in a case where a void of image to be described later occurs only on one end in the longitudinal direction and does not occur on the other end in the longitudinal direction, the pressing force of only the pressing mechanism on one end in the longitudinal direction is adjusted. Adjustment of the pressing force of the pressing mechanism is performed to reduce an inconvenience that the developing device 5 is reduced in weight by the amount of toner consumed over time and the developing device 5 flutters to cause an abnormality such as a void of an image unless the contact pressure of the developing roller 5*a* against the photoconductor drum 1 is set to be large. Accordingly, the adjustment of the pressing force can be performed based on the image quality of the image to be printed (depending on the occurrence of a void of image), for example, performed when a void of image occurs), or can be performed based on the operation time of the developing device 5, for example, performed when the toner near-end state is displayed.

With reference to FIGS. 6, 7, 8A, and 8B, the second holding portion 31*c* has a space A communicating with the hole 31*a* and opening toward the first holding portion 31*b* (the side in the counterclockwise direction in FIG. 7) on the upstream side (lower position) in the biasing direction. In other words, the second holding portion 31*c* is not formed in a solid structure with respect to the surface on which the first holding portion 31*b* is formed but has a space A having a hollow structure that communicates with the hole 31*a*. The space A has an opening B (slit) that communicates with the first holding portion 31*b* on the side in the counterclockwise direction in FIG. 7. The space A has a substantially fan-columnar shape following the shape of the second holding portion 31*c*.

Figure 8A:
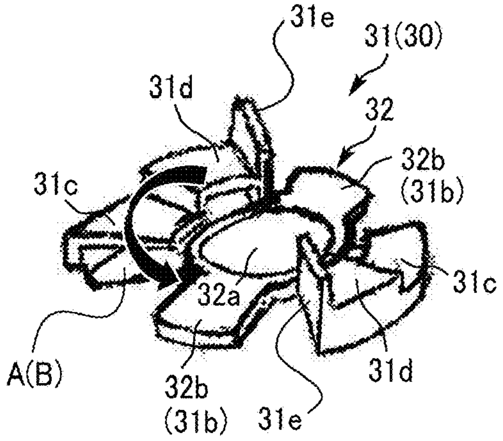
FIG. 8A is a perspective view of the holder illustrating an operation in which a supporter is moved to and held by a first holding portion.
Figure 8B:
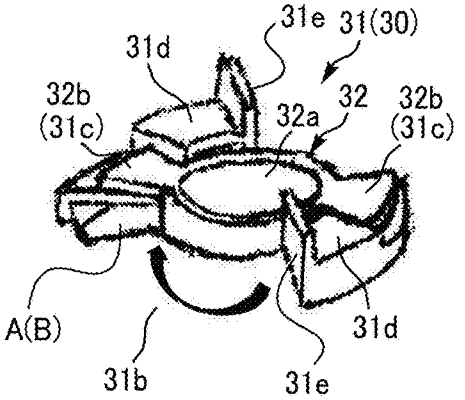
FIG. 8B is a perspective view of the holder illustrating an operation in which the supporter is moved to and held by a second holding portion.

With reference to FIG. 8A, after the projection 32*b* is inserted into the space A from the upstream side in the biasing direction (from below the case 30) and the columnar portion 32*a* is inserted into the hole 31*a*, the supporter 32 is rotated around the hole 31*a* with the rotation direction toward the first holding portion 31*b* being the forward direction (counterclockwise direction), so that the projection 32*b* is held by the first holding portion 31*b* (the state of FIG. 8A). In FIGS. 8A and 8B, the compression spring 33 is not illustrated for the sake of simplicity. On the other hand, with reference to FIG. 8B, the supporter 32 is rotated around the hole 31*a* from the state where the projection 32*b* is held by the first holding portion 31*b* (the state of FIG. 8A) with the rotation direction toward the second holding portion 31*c* being the reverse direction (clockwise direction), so that the projection 32*b* is held by the second holding portion 31*c* (the state of FIG. 8B). Although not illustrated in FIG. 8B, the supporter 32 is rotated in the opposite direction (clockwise direction) around the hole 31*a* from the state (the state of FIG. 8B) where the projection 32*b* is held by the second holding portion 31*c*, so that the projection 32*b* is held by the third holding portion 31*d*. When the holding position of the supporter 32 is changed from the second holding portion 31*c* to the first holding portion 31*b* or is changed from the third holding portion 31*d* to the second holding portion 31*c*, the supporter 32 is rotated in the forward direction (counterclockwise direction).

Hereinafter, a description is supplementarily given of the assembly of the supporter 32 to the holder 31 (the case 30) and the adjustment of the pressing force. When the supporter 32 is assembled to the holder 31 (the case 30), first, the columnar portion 32*a* enters the hole 31*a*, and the supporter 32 is inserted from below the holder 31 such that the projection 32*b* enters the space A of the second holding portion 31*c*. At this time, the compression spring 33 is inserted into the concave portion 32*a*1 of the columnar portion 32*a*. A Phillips screwdriver is inserted into the operation portion 32*a*2 (cross-shaped hole) from below, and the screwdriver is operated to rotate the supporter 32 in the forward direction (counterclockwise direction) while receiving the biasing force of the compression spring 33. As a result, the projection 32*b* passes through the opening B and is held on the first holding portion 31*b*. The state in which the projection 32*b* is held on the first holding portion 31*b* is a basic setting (initial setting) in the manufacturing process of the process cartridge 10 in a manufacturing plant. On the other hand, when an operator such as a service person changes the supporter 32 (the projection 32*b*) held by the first holding portion 31*b* to the state held by the second holding portion 31*c* (when the pressing force is adjusted to be increased) for the process cartridge 10 used in the market, the operator inserts a Phillips screwdriver into the operation portion 32*a*2 (the cross-shaped hole) again from below and operates the Phillips screwdriver to rotate the supporter 32 in the opposite direction (clockwise direction). At this time, the supporter 32 is pushed up while a Phillips screwdriver is pushed upward such that the projection 32*b* gets over the step (the step between the first holding portion 31*b* and the second holding portion 31*c*). Similarly, also when an operator such as a service person changes the supporter 32 (the projection 32*b*) held by the second holding portion 31*c* to the state held by the third holding portion 31*d* (when the pressing force is adjusted to be further increased), the operator operates a Phillips screwdriver to rotate the supporter 32 in the opposite direction (clockwise direction) and pushes up the supporter 32 while pushing up the Phillips screwdriver upward.

As described above, the rotation direction (forward direction) of the supporter 32 when the supporter 32 is assembled to the holder 31 and the rotation direction (reverse direction) when the pressing force is largely adjusted after the assembly operation are set to be different directions, and thus an inconvenience in which an operator erroneously assembles the supporter 32 such that the projection 32*b* (supporter 32) is held at the second holding portion 31*c* and the third holding portion 31*d* other than the first holding portion 31*b* at the time of assembly during manufacturing can be reduced.

With reference to FIGS. 6, 7, 8A, and 8B, in the present embodiment, the holder 31 (the case 30) has a partition 31*e*, which stands toward the downstream side (the higher position) in the biasing direction, on the side of the forward direction (the clockwise direction) with respect to the first holding portion 31*b*. Specifically, the partition 31*e* is disposed between the first holding portion 31*b* and the third holding portion 31*d* to extend to a position higher than the third holding portion 31*d* with the same width as the third holding portion 31*d* in the radial direction. The holder 31 has the partition 31*e* as described above, so that the rigidity of the second holding portion 31*c* and the third holding portion 31*d* having a hollow structure can be secured. The holder 31 has the partition 31*e*, so that the rotation of the supporter 32 in the forward direction beyond the first holding portion 31*b* at the time of assembly can be restricted. An inconvenience that the projection 32*b* (supporter 32) held by the third holding portion 31*d* falls off to the position of the first holding portion 31*b* due to vibration can be prevented.

As described above, in the pressing mechanism in the present embodiment, the holder 31 (the case 30) is formed such that a plurality of holding portions 31*b* to 31*d* for holding the supporter 32 at positions in different biasing directions are disposed at different positions around the supporter 32. Even when the developing device 5 is reduced in weight with the consumption of the toner over time, such a configuration can relatively easily optimize the pressing force of the developing device 5 (developing roller 5*a*) against the photoconductor drum 1 without complicating the configuration of the pressing mechanism or automatically controlling the pressing mechanism. Accordingly, an inconvenience that the pressure of the developing roller 5*a* to the photoconductor drum 1 becomes insufficient over time and abnormality such as a void of an image occurs in the image formed on the photoconductor drum 1 is reduced. Such a pressing mechanism in which the pressing force is easily adjusted is used, so that the pressing force can be easily adjusted, even when a target pressing force cannot be obtained due to a dimensional error or an assembly error of components in the manufacturing process of the process cartridge 10. Even when an operator such as a service person performs maintenance to reduce a void of an image that has suddenly occurred in the process cartridge 10 which is being used in the market, the operator can easily adjust the pressing force.

First Modification

Figure 9:
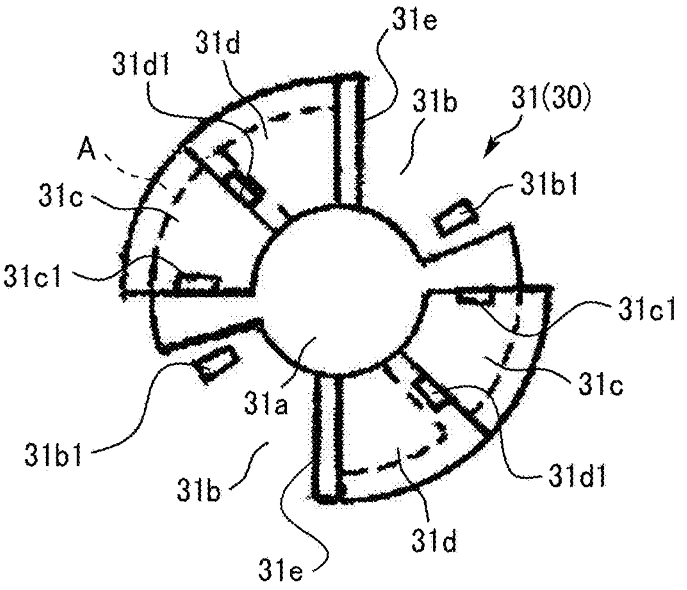
FIG. 9 is a top view of a holder according to a first modification of the present embodiment.
Figure 10A:
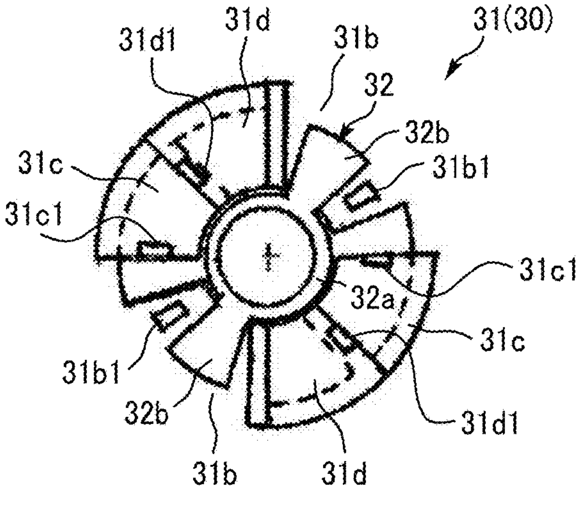
FIG. 10A is a top view of the supporter held by the first holding portion in the holder of FIG. 9.
Figure 10B:
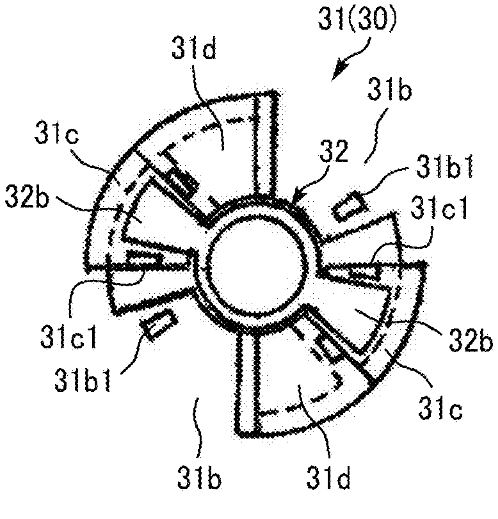
FIG. 10B is a top view of the supporter held by the second holding portion in the holder of FIG. 9.

As illustrated in FIGS. 9, 10A and 10B the holder 31 (the case 30) in the first modification has a convex portion 31*b*1 that restricts the rotation of the supporter 32 toward the second holding portion 31*c* on the first holding portion 31*b*. The convex portion 31*b*1 is formed to protrude in the biasing direction (upward) from the surface on which the first holding portion 31*b* is formed and is fitted with the projection 32*b* of the supporter 32 to restrict the rotation of the supporter 32. The second holding portion 31*c* has a convex portion 31*cl* that restricts the rotation of the supporter 32 toward the first holding portion 31*b*. The convex portion 31*cl* is formed to protrude in the biasing direction (upward) from the surface on which the second holding portion 31*c* is formed and is fitted with the projection 32*b* of the supporter 32 to restrict the rotation of the supporter 32. The third holding portion 31*d* has a convex portion 31*d*1 that restricts the rotation of the supporter 32 toward the second holding portion 31*c*. The convex portion 31*d*1 is formed to protrude in the biasing direction (upward) from the surface on which the third holding portion 31*d* is formed and is fitted with the projection 32*b* of the supporter 32 to restrict the rotation of the supporter 32. Setting the size of the central angle having a fan shape of the first holding portion 31*b* to the third holding portion 31*d* to be larger than the size of the central angle having the fan shape of the projection 32*b* of the supporter 32 easily secures a space for disposing the convex portions 31*b*1 to 31*d*1 to the first holding portion 31*b* to the third holding portion 31*d*. In a case where the convex portions 31*b*1 to 31*d*1 are disposed, when the supporter 32 (the projection 32*b*) is rotated toward the first holding portion 31*b* to the third holding portion 31*d*, the projection 32*b* preferably gets over the convex portions 31*b*1 to 31*d*1. Accordingly, it is preferable that the heights of the convex portions 31*b*1 to 31*d*1 (the heights in the biasing direction) are set to be equal to the plate thickness of the projection 32*b* or less.

Second Modification

Figure 11:
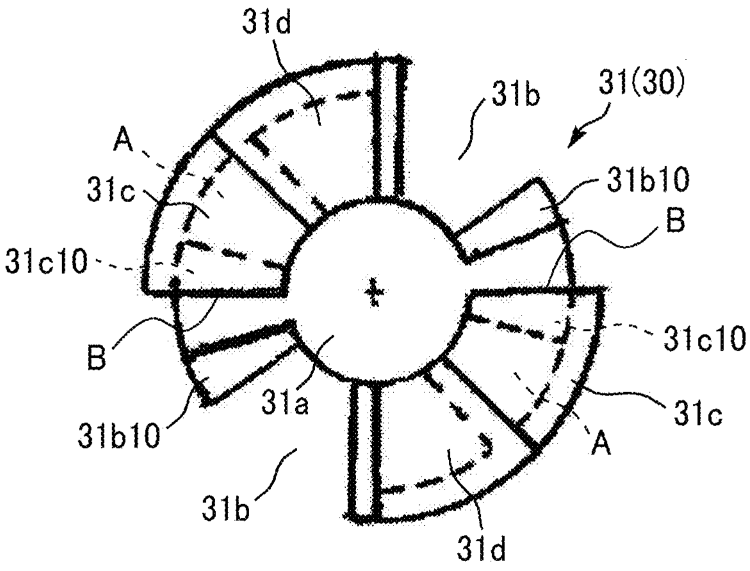
FIG. 11 is a top view of the holder as a second modification of the present embodiment.
Figure 12A:
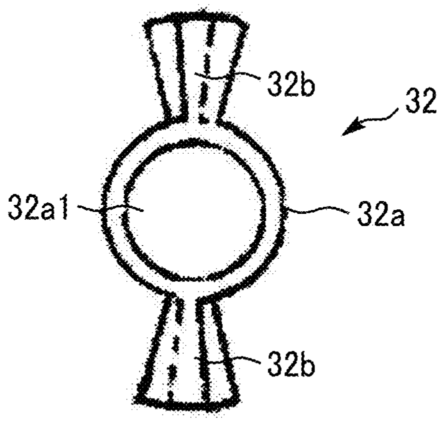
FIG. 12A is a top view of a supporter held by the holder of FIG. 11.
Figure 12B:
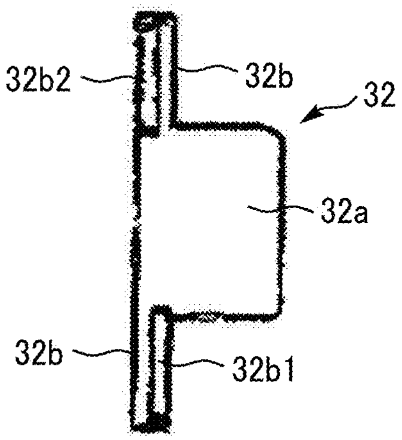
FIG. 12B is a front view of the supporter held by the holder of FIG. 11.
Figure 12C:
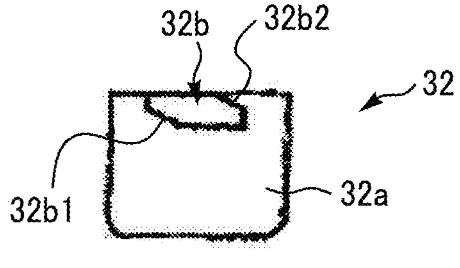
FIG. 12C is a side view of the supporter held by the holder of FIG. 11.
Figure 13A:
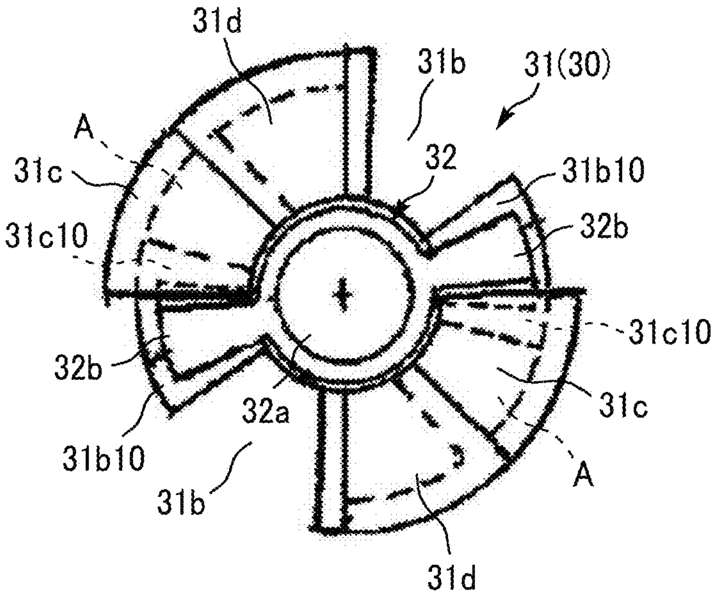
FIG. 13A is a top view of the holder of FIG. 11, illustrating an operation in which the supporter is set to the first holding portion.
Figure 13B:
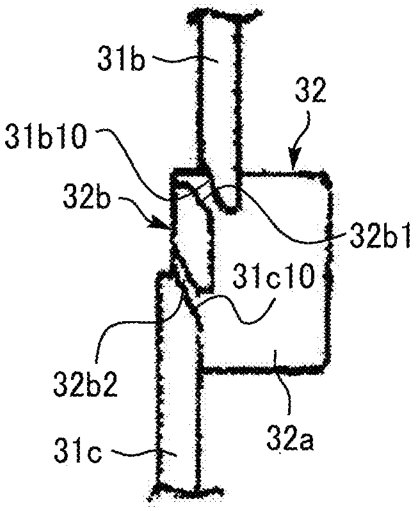
FIG. 13B is a side view of the holder of FIG. 11, illustrating an operation in which the supporter is set to the first holding portion.

As illustrated in FIGS. 12A, 12B, 12C, 13A, and 13B, in the second modification, the projection 32*b* of the supporter 32*a* has a first inclined surface 32*b*1 and a second inclined surface 32*b*2. The first inclined surface 32*b*1 of the projection 32*b* is formed on the upstream side (lower surface of the projection 32*b*) in the biasing direction and on the side of the forward direction (counterclockwise direction) and is an inclined surface that is inclined toward the upstream side (downward) in the biasing direction as the first inclined surface 32*b*1 extends in the reverse direction (clockwise direction). On the other hand, the second inclined surface 32*b*2 of the projection 32*b* is formed on the downstream side (upper surface of the projection 32*b*) in the biasing direction and on the side of the reverse direction (clockwise direction) and is an inclined surface that is inclined toward the downstream side (upward) in the biasing direction as the second inclined surface 32*b*2 extends in the forward direction (counterclockwise direction). As illustrated in FIGS. 11, 13A, and 13B, in the second modification, the first holding portion 31*b* has a tapered portion 31*b*10 that is inclined toward the upstream side (downward) in the biasing direction as the tapered portion 31*b*10 extends in the reverse direction (clockwise direction) at a portion which is an end near the second holding portion 31*c* and is connected to the opening B. On the other hand, the second holding portion 31*c* has a tapered portion 31*c*10 that is inclined toward the downstream side (upward) in the biasing direction as the tapered portion 31*c*10 extends in the forward direction (counterclockwise direction) at a portion which is an end near the first holding portion 31*b* and contacts the space A. With such a configuration, even when the step (offset amount) between the first holding portion 31*b* and the second holding portion 31*c* is set to be small in order to finely set the adjustment amount of the pressing force by the pressing mechanism, the assembling work of the supporter 32 (the work rotating the projection 32*b* in the forward direction toward the first holding portion 31*b* via the opening B) can be smoothly performed without lowering the rigidity with the thinner thickness of the projection 32*b*.

As described above, a pressing mechanism in the second modification is a pressing mechanism that presses the developing device 5 (pressing body) against the photoconductor drum 1 (target body) and includes the compression spring 33, one end of which directly or indirectly contacts the developing device 5 and biases the developing device 5 toward the photoconductor drum 1 in a specified biasing direction. The pressing mechanism in the second modification has a supporter 32 for supporting the other end of the compression spring 33 and a holder 31 for holding the supporter 32. In the holder 31, a plurality of holding portions 31*b* to 31*d* for holding the supporter 32 at positions in different biasing directions are disposed at different positions around the supporter 32. With such a configuration, the pressure of the developing device 5 to the photoconductor drum 1 can be relatively easily optimized over time.

In the present embodiment, the pressing mechanism is disposed in the process cartridge 10 in which the photoconductor drum 1 (image bearer), the charging roller 4 (charging device), the developing device 5, and the cleaning device 2 are united, and presses the developing device 5 (pressing body) against the photoconductor drum 1 (target object). The present disclosure is not limited to the embodiment described above and can be applied to any pressing mechanism in which the pressing body presses the target body. Even in such a case, substantially the same effects as the effects in the present disclosure can be obtained. The term "process cartridge" used in the present disclosure is defined as a unit that includes an image bearer united with at least one of a charging device to charge the image bearer, a developing device to develop a latent image on the image bearer, and a cleaning device to clean a surface of the image bearer, and that is detachably attached to a body of an image forming apparatus.

In the present embodiment, the holder 31 has the three holding portions 31*b* to 31*d*. However, the number of holding portions may be two or four or more. In the present embodiment, the supporter 32 has two projections 32*b*. However, the number of projections 32*b* is not limited to this and may be three or more. In this case, a plurality of projections are preferably arranged at equal intervals in the circumferential direction from the viewpoint of the load balance. In the holder, the holding portions having the same height position are formed in accordance with the number and positions of the projections. In the present embodiment, the pressing mechanisms are disposed at both ends of the process cartridge 10 in the longitudinal direction. However, one pressing mechanism may be disposed at the center of the process cartridge 10 in the longitudinal direction, or three or more pressing mechanisms may be installed at intervals in the longitudinal direction. Any of the cases described above can obtain the same advantageous effect as the advantageous effect of the present embodiment.

The above-described embodiments and modifications are illustrative and do not limit this disclosure. Thus, numerous additional modifications and variations are possible in light of the above teachings. For example, elements and/or features of different illustrative and exemplary embodiments herein may be combined with each other and/or substituted for each other within the scope of this disclosure and appended claims. Further, features of components such as the number, the position, and the shape are not limited to the above-described embodiments, and thus may be set to any number, position, and shape suitable for an embodiment of the present disclosure.

Aspects of the present disclosure may be, for example, combinations of first to fifteenth aspects as follows.

First Aspect

A pressing mechanism that presses a pressing body (e.g., the developing device 5) against a target object (e.g., the photoconductor drum 1) includes a compression spring (e.g., the compression spring 33), a supporter (e.g., the supporter 32), and a holder (e.g., the holder 31). The compression spring has one end that directly or indirectly contacts the pressing body and biases the pressing body in a specified biasing direction toward the target object. The supporter supports another end of the compression spring. The holder holds the supporter. The holder has a plurality of holding portions (e.g., the first holding portion 31*b*, the second holding portion 31*c*, the third holding portion 31*d*) for holding the supporter at different positions in the biasing direction. The plurality of holding portions are arranged at different positions around the supporter.

Second Aspect

In the pressing mechanism according to the first aspect, the supporter (e.g., the supporter 32) includes a columnar portion (e.g., the columnar portion 32*a*) and at least two projections (e.g., the projection 32*b*). The columnar portion has a concave portion (e.g., the concave portion 32*a*1) into which the other end of the compression spring (e.g., the compression spring 33) is inserted. The at least two projections protrude in a radial direction from a periphery of the columnar portion and are arranged at equal intervals in a circumferential direction of the columnar portion. The holder has a hole (e.g., the hole 31*a*) and the plurality of holding portions (e.g., the first holding portion 31*b*, the second holding portion 31*c*, the third holding portion 31*d*). The columnar portion is inserted in the hole. The plurality of holding portions are arranged in a stepped manner to be different in positions in the biasing direction, are arranged around the hole with a phase shift in the circumferential direction of the hole, and are capable of holding the at least two projections.

Third Aspect

In the pressing mechanism according to first or second aspect, the plurality of holding portions (e.g., the first holding portion 31*b*, the second holding portion 31*c*, the third holding portion 31*d*) have a first holding portion (e.g., the first holding portion 31*b*) and a second holding portion (e.g., the second holding portion 31*c*). The first holding portion is positioned on the most upstream side in the biasing direction. The second holding portion is located adjacent to the first holding portion in the circumferential direction and is positioned on the downstream side in the biasing direction with respect to the first holding portion.

Fourth Aspect

In the pressing mechanism according to the third aspect, the second holding portion (e.g., the second holding portion 31*c*) has a space (e.g., the space A) that communicates with the hole (e.g., the hole 31*a*) and opens toward the first holding portion (e.g., the first holding portion 31*b*) on the upstream side in the biasing direction. The supporter (e.g., the supporter 32) is rotated around the hole (e.g., the hole 31*a*) with the direction of rotation toward the first holding portion (e.g., the first holding portion 31*b*) being the forward direction after the projection (e.g., the projection 32*b*) is inserted into the space from the upstream side in the biasing direction and the columnar portion (e.g., the columnar portion 32*a*) is inserted into the hole, so that the projection is held by the first holding portion.

Fifth Aspect

In the pressing mechanism according to third or fourth aspect, the supporter (e.g., the supporter 32) is rotated around the hole (e.g., the hole 31*a*) with the direction of rotation toward the second holding portion (e.g., the second holding portion 31*c*) being the reverse direction from a state where the projection (e.g., the projection 32*b*) is held by the first holding portion (e.g., the first holding portion 31*b*), so that the projection is held by the second holding portion.

Sixth Aspect

In the pressing mechanism according to any one of the third to fifth aspects, the plurality of holding portions have a third holding portion (e.g., the third holding portion 31*d*).

The third holding portion is located adjacent to the second holding portion (e.g., the second holding portion 31*c*) in the opposite direction in the circumferential direction and positioned on the downstream side in the biasing direction with respect to the second holding portion.

Seventh Aspect

In the pressing mechanism according to any one of the third to sixth aspects, the holder (e.g., the holder 31) has a partition (e.g., the partition 31*e*), which stands toward the downstream side in the biasing direction, on the side in the forward direction with respect to the first holding portion (e.g., the first holding portion 31*b*).

Eighth Aspect

In the pressing mechanism according to any one of the third to seventh aspects, the first holding portion (e.g., the first holding portion 31*b*) has a convex portion (e.g., the convex portion 31*c*1) that restricts rotation of the supporter (e.g., the supporter 32) toward the second holding portion (e.g., the second holding portion 31*c*).

Ninth Aspect

In the pressing mechanism according to any one of the third to eighth aspects, the second holding portion (e.g., the second holding portion 31*c*) has a convex portion (e.g., the convex portion 31*c*1) that restricts rotation of the supporter (e.g., the supporter 32) toward the first holding portion (e.g., the first holding portion 31*b*).

Tenth Aspect

In the pressing mechanism according to the fifth aspect, the projection (e.g., the projection 32*b*) of the supporter (e.g., the supporter 32) has a first inclined surface (e.g., the first inclined surface 32*b*1) and a second inclined surface (e.g., the second inclined surface 32*b*2). The first inclined surface (e.g., the first inclined surface 32*b*1) is formed on the upstream side in the biasing direction and on the side in the forward direction and is inclined toward the upstream side in the biasing direction as the first inclined surface extends in the reverse direction. The second inclined surface is formed on the downstream side in the biasing direction and on the side in the reverse direction and is inclined toward the downstream side in the biasing direction as the second inclined surface extends in the forward direction.

Eleventh Aspect

In the pressing mechanism according to the tenth aspect, the first holding portion (e.g., the first holding portion 31*b*) has a tapered portion (e.g., the tapered portion 31*b*10) at an end near the second holding portion (e.g., the second holding portion 31*c*) and at a portion connected to an opening (e.g., the opening B) of the space (e.g., the space A) and is inclined toward the upstream side in the biasing direction as the first holding portion extends in the reverse direction. The second holding portion (e.g., the second holding portion 31*c*) has a tapered portion (e.g., the tapered portion 31*c*10) at an end near the first holding portion and at a portion connected to the space (e.g., the space A) and is inclined toward the downstream side in the biasing direction as the second holding portion extends in the forward direction.

Twelfth Aspect

The pressing mechanism according to any one of the first to eleventh aspects, further includes a plurality of pressing mechanisms including the pressing mechanism. The plurality of pressing mechanisms are disposed at intervals in a longitudinal direction of the pressing body (e.g., the developing device 5).

Thirteenth Aspect

In the pressing mechanism according to any one of the first to twelfth aspects, the holder (e.g., the holder 31) is a case (e.g., the case 30) that holds the pressing body (e.g., the developing device 5) to be swingable around a support shaft (e.g., the support shaft 30*a*).

Fourteenth Aspect

A process cartridge (e.g., the process cartridge 10) detachably attached to a body of an image forming apparatus (e.g., the image forming apparatus 100) includes the pressing mechanism according to any one of the first to thirteenth aspects, a photoconductor drum as the target object (e.g., the photoconductor drum 1), and a developing device as the pressing body (e.g., the developing device 5).

Fifteenth Aspect

An image forming apparatus (e.g., the image forming apparatus 100) includes the pressing mechanism according to any one of the first to thirteenth aspects.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A pressing mechanism comprising:
- a compression spring having one end facing a pressing body to bias the pressing body against a target object in a biasing direction;
- a supporter supporting another end of the compression spring; and
- a holder:
- holding the supporter; and
- including multiple holding portions having different heights to hold the supporter at different positions in the biasing direction,
- wherein the multiple holding portions are disposed at different positions in a circumferential direction of the supporter.

2. The pressing mechanism according to claim 1,
- wherein the supporter includes:
- a columnar portion having a concave portion into which another end of the compression spring is insertable; and
- two or more projections protruding from a periphery of the columnar portion in a radial direction, two or more projections being arranged at equal intervals in a circumferential direction of the columnar portion,
- the holder has a hole into which the columnar portion of the supporter is insertable,
- the multiple holding portions has steps having the different heights at the different positions in the biasing direction, and
- the multiple holding portions are arranged around the hole with a phase shift in a circumferential direction of the hole to hold the two or more projections.

3. The pressing mechanism according to claim 2,
- wherein the multiple holding portions have:
- a first holding portion; and
- a second holding portion adjacent to the first holding portion in the circumferential direction of the hole, and
- the second holding portion is disposed downstream from the first holding portion in the biasing direction.

4. The pressing mechanism according to claim 3,
- wherein the second holding portion has a space disposed upstream from the second holding portion in the biasing direction,
- the second holding portion communicates with the hole and opens toward the first holding portion, the supporter is rotated around the hole in the rotation direction toward the first holding portion while the columnar portion inserted into the hole and one of the two or more projections inserted into the space from upstream of the second holding portion in the biasing direction and to hold the projection with the first holding portion.

5. The pressing mechanism according to claim 4, wherein the supporter is rotated around the hole with the rotation direction toward the second holding portion being the reverse direction from a state where the projection is held by the first holding portion, so that the projection is held by the second holding portion.

6. The pressing mechanism according to claim 5, wherein the multiple holding portions have a third holding portion adjacent to the opposite direction in the circumferential direction with respect to the second holding portion, and the third holding portion is positioned downstream in the biasing direction with respect to the second holding portion.

7. The pressing mechanism according to claim 5, wherein the projection of the supporter has:

a first inclined surface upstream in the biasing direction and in the forward direction, the first inclined surface being inclined toward upstream in the biasing direction as the first inclined surface extends in the reverse direction; and a second inclined surface downstream in the biasing direction and in the reverse direction, the second inclined surface being inclined toward downstream in the biasing direction as the second inclined surface extends in the forward direction.

8. The pressing mechanism according to claim 7, wherein the first holding portion has a tapered portion at an end near the second holding portion and at a portion communicating with the opening, the tapered portion being inclined toward upstream in the biasing direction as the first holding portion extends in the reverse direction, and the second holding portion has a tapered portion at an end near the first holding portion and at a portion communicating with the space, the tapered portion being inclined toward downstream in the biasing direction as the second holding portion extends in the forward direction.

9. The pressing mechanism according to claim 4, wherein the holder has a partition, which stands toward downstream in the biasing direction, in the forward direction with respect to the first holding portion.

10. The pressing mechanism according to claim 4, wherein the first holding portion has a convex portion that restricts rotation of the supporter toward the second holding portion.

11. The pressing mechanism according to claim 4, wherein the second holding portion has a convex portion that restricts rotation of the supporter toward the first holding portion.

12. The pressing mechanism according to claim 1, further comprising multiple pressing mechanisms including the pressing mechanism, wherein the multiple pressing mechanisms are disposed at intervals in a longitudinal direction of the pressing body.

13. The pressing mechanism according to claim 1, wherein the holder is a case that holds the pressing body to be swingable around a support shaft.

14. A process cartridge detachably attached to a body of an image forming apparatus comprising:

the pressing mechanism according to claim 1;

a photoconductor drum including the target object; and a developing device including the pressing body.

15. An image forming apparatus comprising the pressing mechanism according to claim 1.

* * * * *